United States Patent
Lee et al.

(10) Patent No.: US 9,792,137 B2
(45) Date of Patent: Oct. 17, 2017

(54) REAL-TIME PERFORMANCE APPARATUS AND METHOD FOR CONTROLLING VIRTUAL MACHINE SCHEDULING IN REAL-TIME

(75) Inventors: Ju-Pyung Lee, Suwon-si (KR); Sang-Bum Suh, Seoul (KR); Sung-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 13/246,929

(22) Filed: Sep. 28, 2011

(65) Prior Publication Data

US 2012/0216193 A1    Aug. 23, 2012

(30) Foreign Application Priority Data

Feb. 21, 2011    (KR) .................. 10-2011-0015280

(51) Int. Cl.
   *G06F 9/46*    (2006.01)
   *G06F 9/455*   (2006.01)

(52) U.S. Cl.
   CPC ............. *G06F 9/45558* (2013.01); *G06F 2009/45575* (2013.01)

(58) Field of Classification Search
   None
   See application file for complete search history.

(56) References Cited

U.S. PATENT DOCUMENTS

| | | | |
|---|---|---|---|
| 5,903,752 A * | 5/1999 | Dingwall et al. | 718/103 |
| 7,356,817 B1 * | 4/2008 | Cota-Robles et al. | 718/1 |
| 8,266,629 B2 * | 9/2012 | Inoue et al. | 718/108 |
| 2003/0037089 A1 * | 2/2003 | Cota-Robles et al. | 709/1 |
| 2004/0010788 A1 * | 1/2004 | Cota-Robles et al. | 718/1 |
| 2005/0278719 A1 * | 12/2005 | Togawa | 718/100 |
| 2007/0016908 A1 * | 1/2007 | Kuroda | 718/107 |
| 2009/0037926 A1 * | 2/2009 | Dinda et al. | 718/107 |
| 2010/0138831 A1 * | 6/2010 | Inoue et al. | 718/1 |

FOREIGN PATENT DOCUMENTS

JP    2010-134496 A    6/2010

OTHER PUBLICATIONS

Korea Office Action dated Jul 26, 2017 in Counterpart Korean Application No. 10-2011-0015280 (3 pages in Korean, 2 pages in English).

* cited by examiner

*Primary Examiner* — Bradley Teets
(74) *Attorney, Agent, or Firm* — NSIP Law

(57) ABSTRACT

A virtualization apparatus is provided. The virtualization apparatus includes a plurality of virtual machines (VMs), a process scheduler configured to schedule processes to be executed on the respective virtual machines, a virtual machine monitor (VMM) configured to provide each of the virtual machine with a virtualized execution environment, a virtual machine scheduler configured to schedule the virtual machines to run in the virtual machine monitor, and a synchronization unit configured to synchronize a process schedule time which is scheduled by the process scheduler and a virtual machine schedule time which is scheduled by the virtual machine scheduler, or to change the virtual machine schedule time in consideration of the process schedule time.

22 Claims, 9 Drawing Sheets

FIG. 4

| TIME PARAMETER | DESCRIPTION |
|---|---|
| FIRST REFERENCE TIME(T1) | GUARANTEED TIME FOR EXECUTING REAL-TIME PROCESS |
| SECOND REFERENCE TIME(T2) | GUARANTEED TIME FOR EXECUTING INTERRUPT |
| THIRD REFERENCE TIME(T3) | GUARANTEED TIME FOR EXECUTING NON-REAL-TIME PROCESS |
| DELAY TIME(Td) | MAXIMUM ALLOWABLE DELAY TIME AT VIRTUAL MACHINE SCHEDULE TIME |

REAL-TIME PERFORMANCE APPARATUS AND METHOD FOR CONTROLLING VIRTUAL MACHINE SCHEDULING IN REAL-TIME

CROSS-REFERENCE TO RELATED APPLICATION(S)

This application claims the benefit under 35 U.S.C. §119(a) of Korean Patent Application No. 10-2011-0015280, filed on Feb. 21, 2011, in the Korean Intellectual Property Office, the entire disclosure of which is incorporated herein by reference for all purposes.

BACKGROUND

1. Field

The following description relates to an apparatus and a method for controlling virtual machine schedule time.

2. Description of the Related Art

A system virtualization technique allows a variety of operating systems (OSes) to run on a single physical device by representing hardware of the physical device as numerous pieces of virtualized hardware. Different types of OSes are enabled to run independently from one another in a virtualized environment provided by the virtualization.

A virtualization system may include a plurality of virtual machines (VMs) and a plurality of virtual machine monitors. A virtual machine scheduler of a virtual machine monitor may determine which virtual machine among a plurality of virtual machines will be run through a physical CPU. In addition, a process scheduler of each virtual machine may determine which process among a plurality of executable processes will be executed through a virtual CPU.

In a virtualized environment, two-level scheduling may be performed in which two schedulers generally have different targets to schedule and have scheduling policies and scheduling times independent from each other.

In a virtualized environment, independent scheduling times may cause problems as discussed below.

Execution of a real-time process may be delayed due to a virtual machine schedule of the virtual machine monitor.

A virtual machine schedule of the virtual machine monitor may suspend execution of a process that has been executing for a short period of time, and thereby context switch of the corresponding process may be futile.

When the virtual machine schedule of the virtual machine monitor suspends execution of process that is holding spin lock and another CPU, therefore, attempts to acquire the spin lock, a lock wait time may be incurred.

SUMMARY

In one general aspect, a virtualization apparatus is provided. The virtualization apparatus includes a plurality of virtual machines (VMs), a process scheduler configured to schedule processes to be executed on the respective virtual machines, a virtual machine monitor (VMM) configured to provide each of the virtual machine with a virtualized execution environment, a virtual machine scheduler configured to schedule the virtual machines to run in the virtual machine monitor, and a synchronization unit configured to synchronize a process schedule time which is scheduled by the process scheduler and a virtual machine schedule time which is scheduled by the virtual machine scheduler, or to change the virtual machine schedule time in consideration of the process schedule time.

The synchronization unit may detect synchronization information that includes the virtual machine schedule time, the process schedule time, a type of a process that is currently executed, a type of a process that is to be executed next, an interrupt to be transmitted to a virtual machine, or a combination thereof, and may synchronize the process schedule time and the virtual machine schedule time based on the detected synchronization information or changes the virtual machine schedule time in consideration of the process schedule time.

Before a virtual machine schedule is commenced, the synchronization unit may determine whether a real-time process is being executed on a virtual machine, and the synchronization unit may change the virtual machine schedule time to be after the execution of the real-time process is completed.

Before a virtual machine schedule is commenced, the synchronization unit may determine whether a real-time process is being executed on a virtual machine, in response to the real-time process being executed, the synchronization unit may determine whether the real-time process has been executed at least for a first reference time, and in response to the real-time process not having been executed for the first reference time, the synchronization unit may delay the virtual machine schedule time by a predefined period of delay time.

The synchronization unit may invoke the virtual machine scheduler to schedule a virtual machine at the delayed virtual machine schedule time or at the time of termination of the execution of the real-time process.

Before the virtual machine schedule is commenced, the synchronization unit may determine whether an interrupt is transmitted to a virtual machine, in response to the interrupt being transmitted, the synchronization unit may determine whether processing of the interrupt can be performed at least for a second reference time, and in response to the processing of the interrupt not being able to be performed at least for the second reference time, the synchronization unit may delay the virtual machine schedule time by a predefined period of delay time.

The synchronization unit may invoke the virtual machine scheduler at the delayed virtual machine schedule time or at the time of termination of the execution of a real-time process woken up by the interrupt.

Before a process schedule is commenced, the synchronization unit may determine whether a process to be executed next is a non-real-time process, in response to the process to be executed next being a non-real-time process, the synchronization unit may determine whether the non-real-time process can be executed at least for a third reference time or not, and in response to the non-real-time process not being able to be executed at least for the third reference time, the synchronization unit may advance the virtual machine schedule time.

The synchronization unit may change the virtual machine schedule to be synchronized with the process schedule time.

In another aspect, an apparatus for controlling a virtual machine schedule time is provided. The apparatus includes a detecting unit configured to detect synchronization information that includes a virtual machine schedule time, a process schedule time, a type of a process that is currently executed, a type of a process that is to be executed next, an interrupt to be transmitted to a virtual machine, or a combination thereof, and a control unit configured to synchronize the virtual machine schedule time and the process schedule time based on the detected synchronization information, or to change the virtual machine schedule time in consideration of the process schedule time.

Before the virtual machine schedule is commenced, the control unit may determine whether a real-time process is being executed on a virtual machine, and in response to the real-time process being executed, the control unit may change the virtual machine schedule time to be after the execution of the real-time process is completed.

Before a virtual machine schedule is commenced, the control unit may determine whether a real-time process is being executed on a virtual machine, in response to the real-time process being executed, the control unit may determine whether the real-time process has been executed at least for a first reference time, and in response to the real-time process not having been executed at least for the first reference time, the control unit may delay the virtual machine schedule time by a predefined period of delay time.

The control unit may invoke a virtual machine scheduler to schedule a virtual machine at the delayed virtual machine schedule time or at the time of terminating the execution of the real-time process.

Before a virtual machine schedule is commenced, the control unit may determine whether an interrupt is transmitted to the virtual machine, in response to the interrupt being transmitted, the control unit may determine whether processing of the interrupt can be performed at least for a second reference time, and in response to the process of the interrupt not being able to be performed at least for the second reference time, the control unit may delay the virtual machine schedule time by a predefined period of delay time.

The control unit may invoke the virtual machine scheduler to schedule the virtual machine at the delayed virtual machine schedule time or at the time of terminating the execution of a real-time process woken up by the interrupt.

Before a process schedule is commenced, the control unit may determine whether a process to be executed next is a non-real-time process, in response to the process to be executed next being a non-real-time process, the control unit may determine whether the non-real-time process can be executed at least for a third reference time, and in response to the non-real-time process not being able to be executed at least for the third reference time, the control unit may advance the virtual machine schedule time.

The control unit may change the virtual machine schedule time to be synchronized with the process schedule time.

In yet another aspect, a method of controlling a virtual machine schedule time is provided. The method includes detecting synchronization information that includes a virtual machine schedule time, a process schedule time, a type of a process that is currently executed, a type of a process that is to be executed next, an interrupt to be transmitted to a virtual machine, or a combination thereof, and synchronizing the virtual machine schedule time and the process schedule time based on the detected synchronization information, or changing the virtual machine schedule time in consideration of the process schedule time.

The changing of the virtual machine schedule time may include before a virtual machine schedule is commenced, determining whether a real-time process is being executed on a virtual machine, and in response to the real-time process being executed, changing the virtual machine schedule time to be after the execution of the real-time process may be completed.

The changing of the virtual machine schedule time may include before a virtual machine schedule is commenced, determining whether a real-time process is being executed on a virtual machine, in response to the real-time process being executed, determining whether the real-time process has been executed at least for a first reference time, and in response to the real-time process not having been executed at least for the first reference time, delaying the virtual machine schedule time by a predefined period of delay time.

The changing of the virtual machine schedule time may include before a virtual machine schedule is commenced, determining whether an interrupt is transmitted to the virtual machine, in response to the interrupt being transmitted, determining whether processing of the interrupt can be performed at least for a second reference time, and in response to the process of the interrupt not being able to be performed at least for the second reference time, delaying the virtual machine schedule time by a predefined period of delay time.

The changing of the virtual machine schedule time may include before a process schedule is commenced, determining whether a process to be executed next is a non-real-time process, in response to the process to be executed next being a non-real-time process, determining whether the non-real-time process can be executed at least for a third reference time, and in response to the non-real-time process not being able to be executed at least for the third reference time, advancing the virtual machine schedule time.

In yet another aspect, a method of controlling a virtual machine schedule time is provided. The method includes before a beginning of a virtual machine schedule, determining whether to delay a virtual machine schedule time by a predetermined amount of time based on execution of a real-time process within a first time or transmission of an interrupt to a currently executing virtual machine within a second time, in response to the virtual machine schedule time being delayed, determining whether the execution of the real-time process has terminated, or the predetermined time has been reached, and performing the virtual machine schedule.

The predetermined time being a maximum allowable time by which a virtual machine schedule time may be delayed.

The first time may correspond with an amount of time for executing the real-time process.

The second time may correspond with an amount of time for executing the interrupt.

Other features and aspects may be apparent from the following detailed description, the drawings, and the claims.

BRIEF DESCRIPTION OF THE DRAWINGS

FIG. 4 is a graph illustrating an example of second parameters for controlling a virtual machine schedule time.

Figure 1:
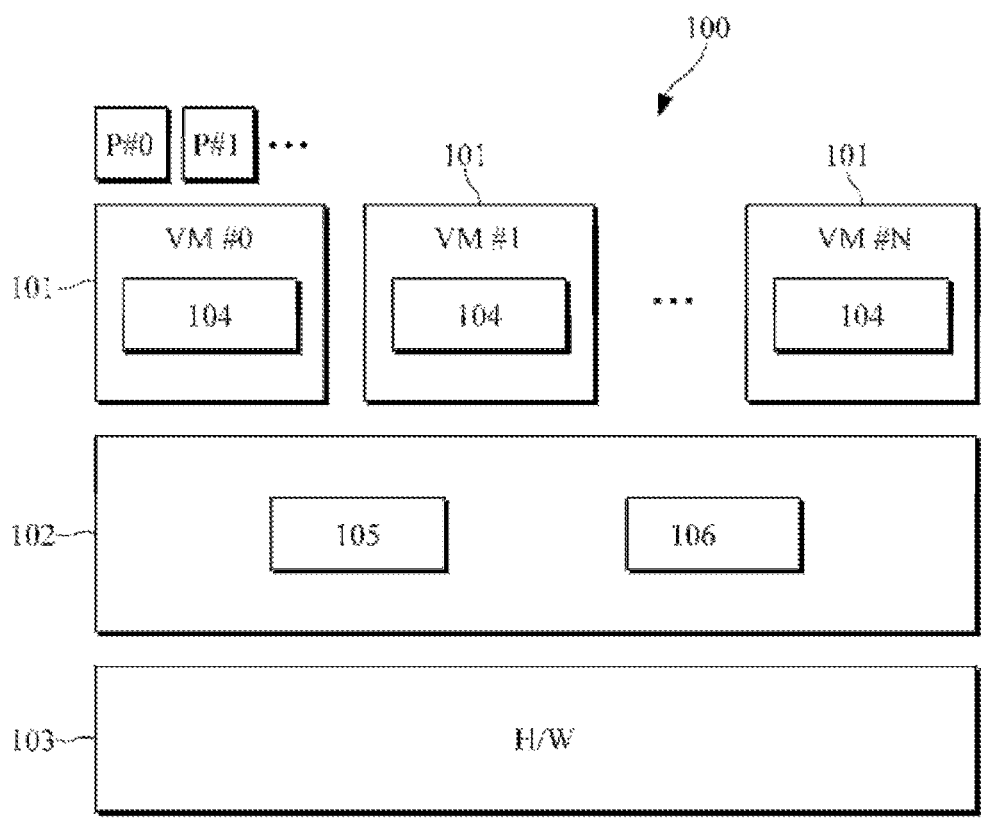
FIG. 1 is a diagram illustrating an example of a virtualization system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

An apparatus and method for controlling a schedule time is described hereinafter and may be applicable to a virtualization-environment-based system in which multiple operating systems (OSes) are executing on a virtual machine monitor (VMM) of a virtual machine (VM).

FIG. 1 illustrates an example of a virtualization system.

Referring to FIG. 1, the virtualization system 100 may include a plurality of virtual machines (VMs) 101, a virtual machine monitor (VMM) 102, and hardware 103.

The virtual machines VM#0~VM#N may include OSes of different types. For example, VM#0 101 may be Windows and VM#1 101 may be Linux.

The virtual machines VM#0-VM#N may be categorized into control virtual machines and guest virtual machines. The control virtual machine may be a virtual machine capable of directly accessing the hardware 103. The guest virtual machine may be a virtual machine that is not capable of directly accessing the hardware 103. The control virtual machine and the guest virtual machine may be initially specified, and in some cases, switching between the control virtual machine and the guest virtual machine may occur.

Each of the virtual machines VM#0~VM#N may include a process scheduler 104. The process scheduler 104 may schedule, for example, processes P#0 and P#1 may be executed in the virtual machine 101. In other words, a target of the process scheduler 104 may be a process. For example, the process scheduler 104 of VM#0 may schedule processes P#0 and P#1 of VM#0 according to at least one predefined scheduling policy.

The virtual machine monitor 102 may provide an environment that allows different types of virtual machines to run on the same hardware 103. For example, the virtual machine monitor 102 may provide a communication channel to at least one virtual machine 101. For example, a guest virtual machine, which cannot access the hardware 103, may transmit a request for use of the hardware 103 to a control virtual machine through the communication channel is provided by the virtual machine monitor 102. The virtual machine monitor 102 may include software such as Xen, Hypervision, L4, and the like.

The virtual machine monitor 102 may include a virtual machine scheduler 105. The virtual machine scheduler 105 may target each of the virtual machines VM#0~VM#N. For example, the virtual machine scheduler 105 may schedule the virtual machines VM#0 to VM#N according to the predefined scheduling policy.

In addition, the virtual machine monitor 102 may include a schedule time control unit 106. The schedule time control unit 106 may 1) collect predefined synchronization information, 2) determine, based on the collected synchronization information, whether or not deterioration of system performance occurs based on the switching between virtual machines or processes, and 3) advance or postpone a virtual machine schedule time scheduled by the virtual machine scheduler 105. For example, the schedule time control unit 106 may synchronize a process schedule time scheduled by the process scheduler 104 with a virtual machine schedule time scheduled by the virtual machine scheduler 105. The schedule time control unit 106 may change the virtual machine schedule time in consideration of the process schedule time based on the collected synchronization information.

In this case, the synchronization information may be an original virtual machine schedule time of the virtual machine scheduler 105, a process schedule time of the process scheduler 104, a type of a process which is being executed in the virtual machine 101, is to be executed next in the virtual machine 101, a type of a generated interrupt, and the like.

Figure 2:
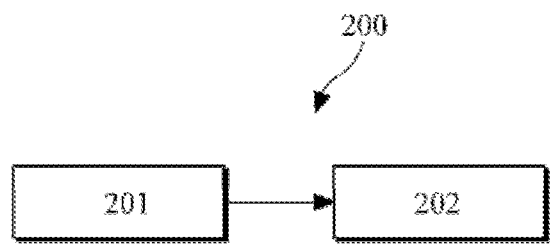
FIG. 2 is a diagram illustrating an example of a virtual machine schedule time control apparatus.

FIG. 2 illustrates an example of a virtual machine schedule time control apparatus. The virtual machine schedule time control apparatus shown in FIG. 2 may be an example of the schedule time control unit 106 illustrated in FIG. 1.

Referring to FIGS. 1 and 2, the virtual machine schedule time control apparatus 200 may include a detecting unit 201 and a control unit 202.

The detecting unit 201 may detect synchronization information. The synchronization information may include a virtual machine schedule time scheduled by the virtual machine monitor 102, a process schedule time scheduled by the virtual machine 101, a type of a process which is currently executed, a type of a process which is to be executed next on the virtual machine 101, a type of an interrupt to be transmitted to the virtual machine 101, or a combination thereof.

"A virtual machine schedule time" may refer to a time at which the virtual machine scheduler 105 present in the virtual machine monitor 102 is invoked. In other words, "a virtual machine schedule time" may be a time at which a currently executed virtual machine is switched into another virtual machine. "A process schedule time" may refer to a time at which the process scheduler 104 present in the virtual machine 101 is invoked. In other words, "a process schedule time" may be a time at which a currently executed process is switched into another process. "A currently executed process" may refer to a process that is currently executed on the executing virtual machine 101, and "a process to be executed next" may refer to a process that is scheduled to be executed next according to the scheduling policy of the process scheduler 104. "An interrupt" may refer to an interrupt that is generated in the hardware 103 and transmitted to the virtual machine 101 via the virtual machine monitor 102.

The control unit 202 may change the virtual machine schedule time based on the detected synchronization information from the detecting unit 201. For example, the control unit 202 may advance or postpone the original virtual machine schedule time.

Figure 3:
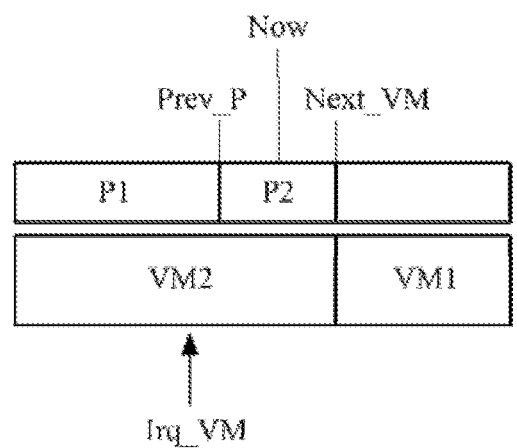
FIG. 3 is a diagram illustrating an example of first parameters for controlling a virtual machine schedule time.

FIG. 3 illustrates an example of first parameters for controlling a virtual machine schedule time.

In FIG. 3, "Now" refers to the present time. "Next_VM" refers to a virtual machine schedule time. For example, to perform scheduling, a virtual machine scheduler (for example, the virtual machine scheduler 105 in FIG. 1) may allocate a pre-determined time quota (for example, budget, quantum, time slice, etc.) to each virtual machine, and may schedule a next virtual machine in response to a currently executing virtual machine consuming all allocated time quota. Thus, the "Next_VM" is a value that is available at an arbitrary time.

"Prev_P" refers to a process schedule time. For example, "Prev_P" may be the most recent time at which the currently executing virtual machine performed process scheduling.

"Prev_P" may be obtained by defining a hypercall which is transferred from the virtual machine and detecting the process switch through the hypercall in response to scheduling occurring in the virtual machine.

"Irq_VM" refers to the most recent time at which the interrupt was transmitted to a currently executing virtual machine. The virtual machine monitor (for example, the virtual machine monitor 102 in FIG. 1) receives an interrupt from the hardware (for example, the hardware 103 in FIG. 1) and transfers the interrupt to each virtual machine, and thus "Irq_VM" may be provided from the virtual machine monitor 102.

These parameters may be collected by the detecting unit 201 shown in FIG. 2 monitoring the statuses of the process scheduler (for example, the process scheduler 104 in FIG. 1), the virtual machine scheduler (for example, the virtual machine scheduler 105 in FIG. 1), the hardware (for example, the hardware 103 in FIG. 1), or a combination thereof.

FIG. 4 illustrates an example of second parameters for controlling a virtual machine schedule time.

In FIG. 4, a first reference time T1 refers to a period of time for which guarantees that a real-time process is executed. For example, a real-time process may be prevented from being suspended during the first reference time T1.

A second reference time T2 refers to a period of time which ensures an interrupt is executed. For example, a generated interrupt may be prevented from being suspended during the second reference time T2.

A third reference time T3 refers to a period of time for which guarantees that a non-real-time process is executed. In other words, in this example, a non-real-time process may be prevented from being suspended during the third reference time T3.

A delay time Td may be the maximum allowable time by which a virtual machine schedule time may be delayed.

The above time-relevant parameters may be set based on a characteristic of each virtual machine, system specifications and system requirements. If values of the parameters are excessively large, schedules for the virtual machines may be made too short or too long compared to allocated time quota, so that fairness between virtual machines may deteriorate. Hence, the time-relevant parameters may be appropriately defined in consideration of a level of fairness and real-time performance.

Figure 5:
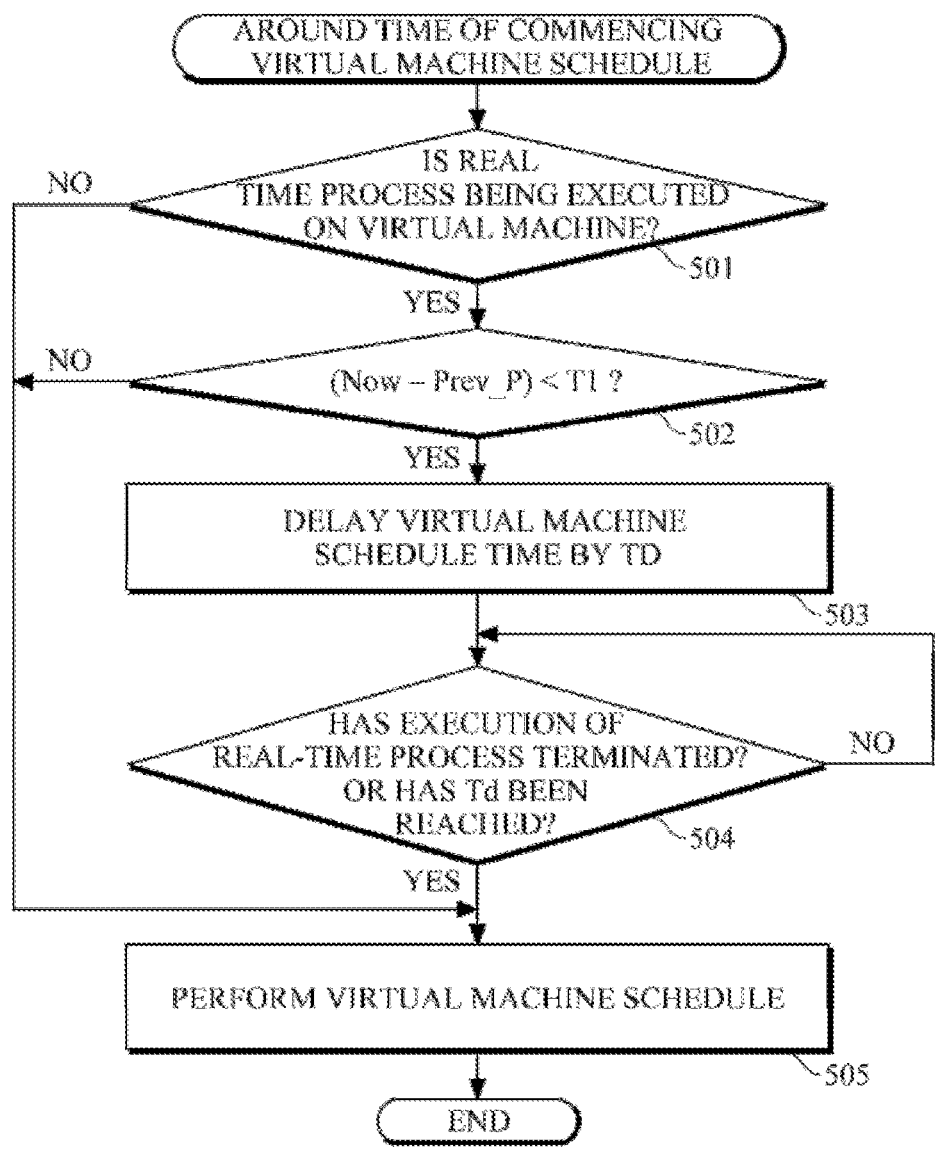
FIG. 5 is a flowchart illustrating an example of a method of controlling a virtual machine schedule time.

FIG. 5 illustrates an example of a method of controlling a virtual machine schedule time.

Referring to FIG. 5, at the time of beginning a virtual machine schedule, a virtual machine schedule time control apparatus (for example, the schedule time control unit 106 in FIG. 1) determines whether a real-time process is currently executed on a virtual machine (501).

In a case in which the real-time process is currently executed on the virtual machine, the virtual machine schedule time control apparatus determines whether the real-time process has been executed for at least a first reference time T1 (502). For example, the virtual machine schedule time control apparatus may determine whether a difference between a time "Prev_P" at which the real-time process is scheduled and the present time "Now" is smaller than the first reference time T1.

If the current real-time process has not been executed for at least the first reference time, the virtual machine schedule time control apparatus delays the virtual machine schedule time for a delay time "Td" (503).

Additionally, the virtual machine schedule control apparatus determines whether the execution of the real-time process has been terminated or whether the delay time Td has been reached (504).

If the execution of the real-time process is terminated or the delay time Td has reached, the virtual machine schedule time control apparatus invokes a virtual machine scheduler (for example, the virtual machine scheduler 105 in FIG. 1) to perform a virtual machine schedule (505).

Figure 6:
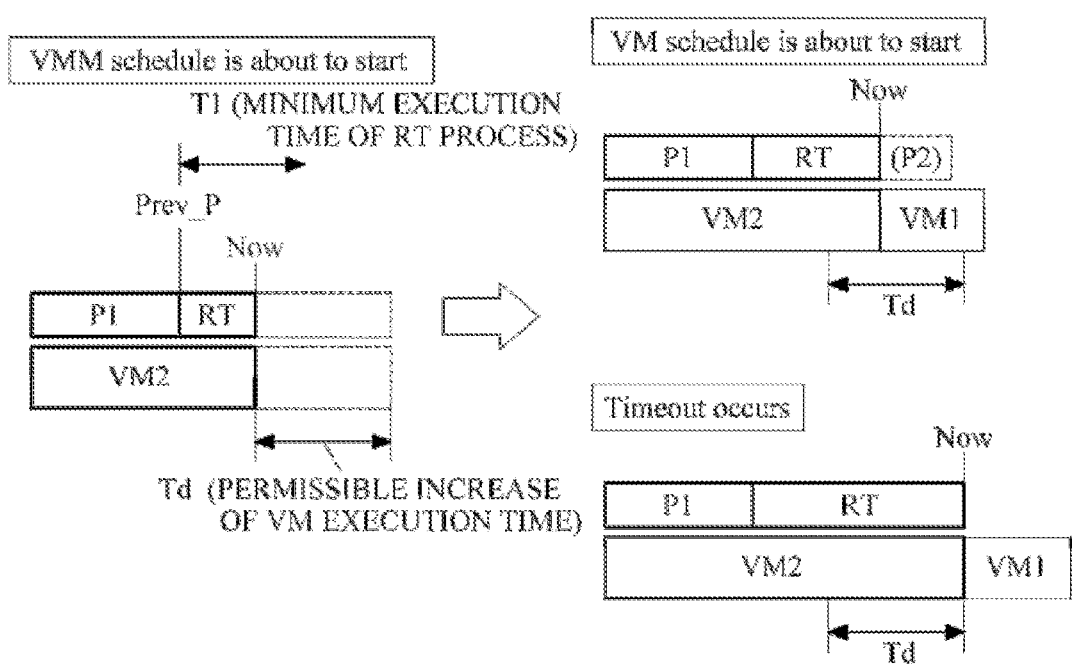
FIG. 6 is a diagram illustrating the method of controlling a virtual machine schedule time shown in FIG. 5.

In another example, operation 502 may be omitted. For example, in response to a real-time process being currently executed on the virtual machine, a virtual machine schedule time may be changed to the time when the execution of the real-time process is terminated. FIG. 6 illustrates the method of controlling a virtual machine schedule time shown in FIG. 5.

In FIG. 6, in a case in which a virtual machine is scheduled to being executed while a real-time process is currently executed on the virtual machine, the execution of the real-time process may be suspended due to a switching between the currently executing virtual machine and another virtual machine, and thus a real-time performance of a system may not be deteriorated.

For example, a process P1 is being executed on an executing virtual machine VM2, and a real-time process RT is scheduled. Soon, a virtual machine scheduler (for example, the virtual machine scheduler 105 in FIG. 1) de-schedules the virtual machine VM2 and schedules a virtual machine VM1. Because the real-time process to be appropriately scheduled and to be executed without delay is important, the delay in executing the real-time process due to the above virtual machine scheduling may have a negative affect on the real-time performance of the virtual machine.

In this case, the virtual machine scheduling may not be performed while the real-time process is being executed. Instead, the virtual machine scheduling may be suspended until the execution of the real-time process is terminated.

For example, the virtual machine schedule time control apparatus (for example, the schedule time control unit 106 in FIG. 1) may check whether a value resulting from subtracting "Prev_P" from "Now" is smaller than the first reference time T1. In response to (Now−Prev_P) being smaller than T1, execution time of the virtual machine VM2 currently in operation is increased by Td. Then, at a time of scheduling a different process in response to the execution of the real-time process being terminated within Td, the virtual machine schedule time control apparatus may perform virtual machine scheduling. On the other hand, in response to the execution of the real-time process not having been terminated within Td, the virtual machine schedule time control apparatus may perform virtual machine scheduling from the virtual machine VM2 to the virtual machine VM1 at an end of Td.

Therefore, since the real-time process RT may be executed at least for the first reference time T1, the real-time performance of the system may be maintained.

Figure 7:
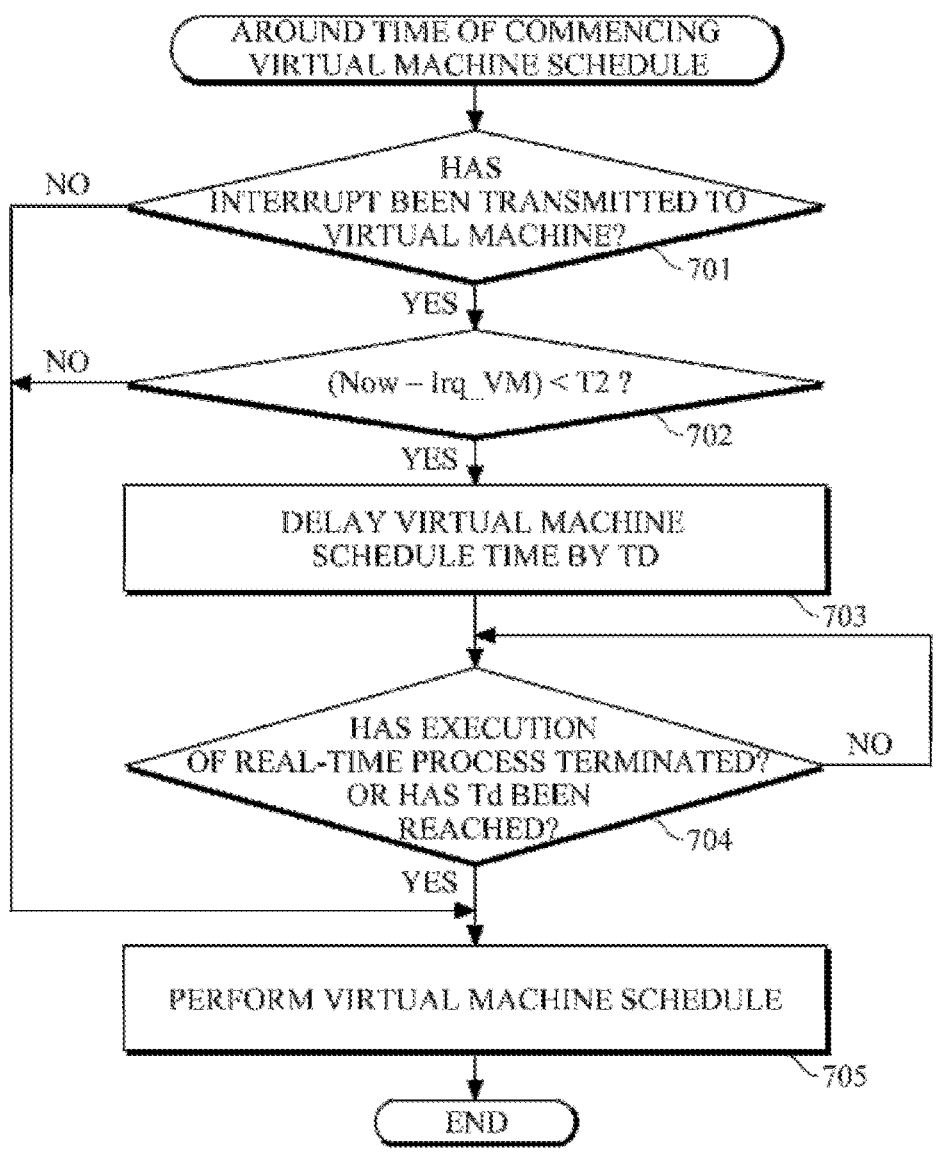
FIG. 7 is a flowchart illustrating another example of a method of controlling a virtual machine schedule time.

FIG. 7 illustrates another example of a method of controlling a virtual machine schedule time.

Referring to FIG. 7, at a beginning of a virtual machine schedule, a virtual machine schedule time control apparatus (for example, the schedule time control unit 106 in FIG. 1) may determine whether an interrupt has been transmitted to a virtual machine (701).

If the interrupt has been transmitted to the virtual machine, the virtual machine schedule time control apparatus determines whether processing of the interrupt may be performed within a second reference time (702). For example, the virtual machine schedule time control apparatus may determine whether a value resulting from a difference between a time "Irq_VM" at which the interrupt is transmitted and the present time "Now" is smaller than the second reference time T2.

In a case in which the processing of the interrupt may not be performed within the second reference time T2, the virtual machine schedule time control apparatus may delay a virtual machine schedule time by a delay time Td in case the interrupt wakes up a real-time process (703).

Then, the virtual machine schedule time control apparatus determines whether the execution of a real-time process woken up by the interrupt has been terminated, or whether the delay time Td has been reached (704).

In response to the execution of real-time process being terminated or in response to the delay time Td having been reached, the virtual machine schedule time control apparatus invokes a virtual machine scheduler (for example, the virtual machine scheduler 105 in FIG. 1) to perform the virtual machine scheduling (705).

In another example, the method shown in FIG. 7 may commence after operation 501 in FIG. 5 in which it is determined that the real-time process is not currently being executed on the virtual machine. For example, in a case in which the virtual machine scheduling is performed in the course of scheduling the real-time process due to the occurrence of an interrupt, the method illustrated in FIG. 5 may not satisfy all real-time properties because the currently executing process is not a real-time process. Thus, the method shown in FIG. 7 and the method shown in FIG. 5 may be combined.

Figure 8:
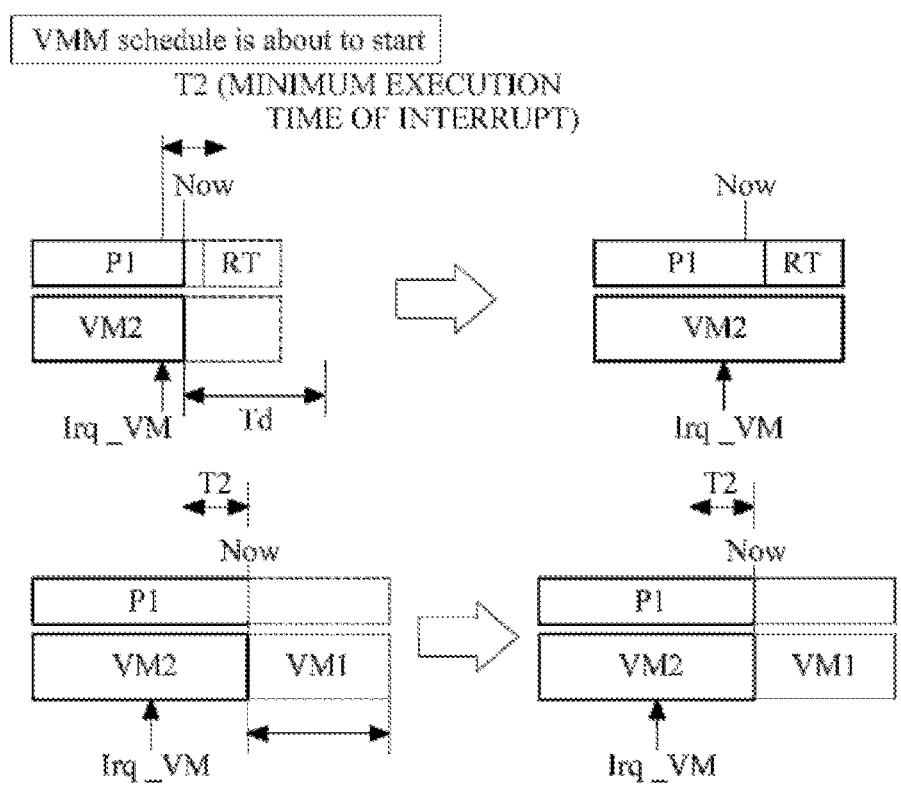
FIG. 8 is a diagram illustrating the method of controlling the virtual machine schedule shown in FIG. 7.

FIG. 8 illustrates the method of controlling the virtual machine schedule shown in FIG. 7.

In FIG. 8, a process P1 has been executed on the executing virtual machine VM2 and an interrupt has been transmitted to the virtual machine VM2. This interrupt may be an urgent interrupt invoking a real-time process RT to execute. At this time, in response to the virtual machine scheduler (for example, the virtual machine scheduler 105 in FIG. 1) de-scheduling the virtual machine VM2 and scheduling the virtual machine VM1 while the interrupt (i.e. before the real-time process RT is scheduled) is being processed, the interrupt processing and the real-time process schedule may be delayed by the execution time of the virtual machine VM1, which may have a serious influence on one or more real-time properties of the corresponding virtual machine VM2.

Thus, in this example, the virtual machine schedule may not perform the virtual machine schedule while the interrupt is being processed, and instead suspend the virtual machine schedule until the interrupt has been processed and the execution of a scheduled real-time process has been terminated.

For example, the virtual machine schedule time control apparatus (for example, the schedule time control unit 106 in FIG. 1) may compare a value of "Now"–"Irq_VM" and a second reference time T2 at the time of generating the virtual machine schedule. In response to the value of "Now"–"Irq_VM" being smaller than the second reference time T2, the virtual machine schedule time control apparatus may delay the virtual machine schedule time by Td, and allow the current virtual machine to continue to execute. Accordingly, the executing virtual machine VM2 is enabled to schedule the real-time process. However, in response to the value of "Now"–"Irq_VM" being greater than the second reference time T2, the virtual machine schedule time is not delayed and immediately the virtual machine schedule on the first virtual machine VM1 may be started.

Figure 9:
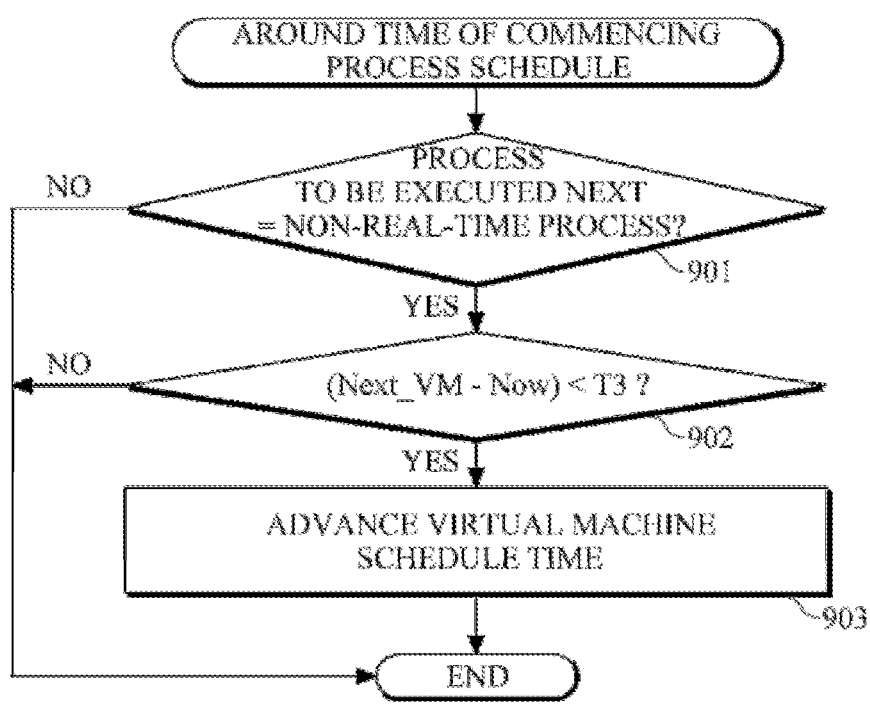
FIG. 9 is a flowchart illustrating another example of a method of controlling a virtual machine schedule time.

FIG. 9 illustrates another example of a method of controlling a virtual machine schedule time.

Referring to FIG. 9, at the commence of the process schedule, a virtual machine time control apparatus (for example, the schedule time control unit 106 in FIG. 1) determines whether a process to be executed next is a non-real-time process (901).

In a case where the process to be executed next is a non-real-time process, the virtual machine schedule time control apparatus determines whether the non-real-time process may be executed for at least a third reference time T3 (902). For example, the virtual machine schedule time control apparatus may determine whether a value resulting from a difference between a virtual machine schedule time point "Next_VM" and the present time "Now" is smaller than the third reference time T3.

In response to the next non-real-time process not being executed within the third reference time, the virtual machine schedule time control apparatus advances the virtual machine schedule time to be synchronized with the process schedule time such that an immediate virtual machine schedule may be made (903).

In one example, in a case where a process to be executed next is a real-time process, the process schedule may be carried out to ensure the real-time properties in operation 901.

Figure 10:
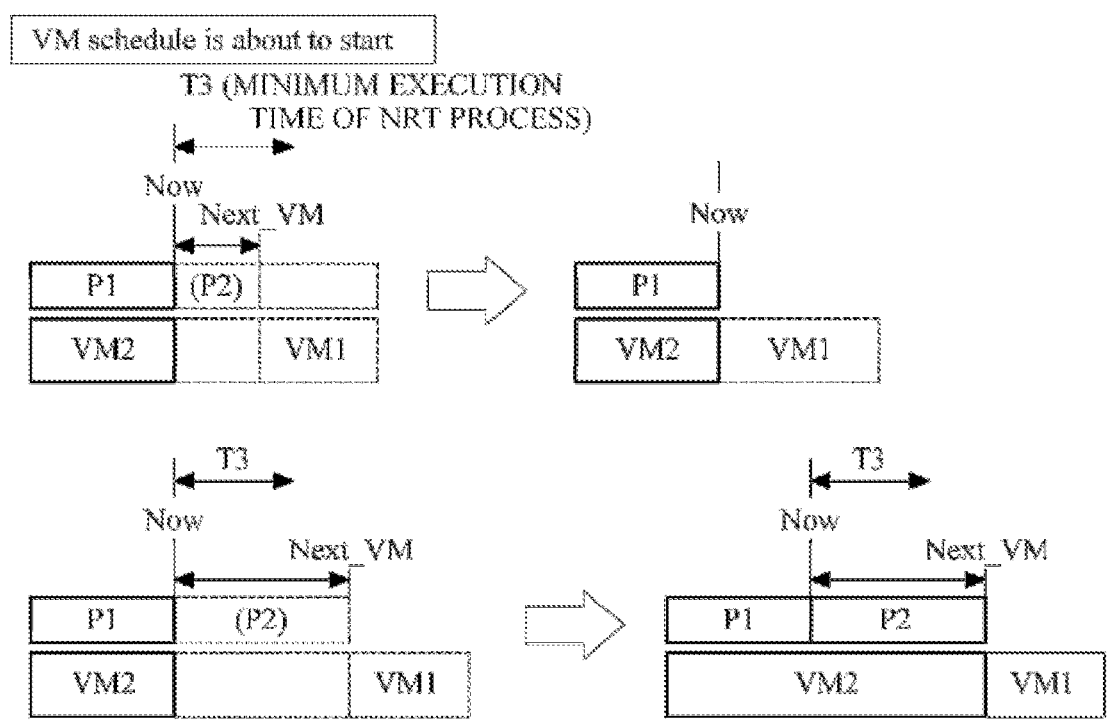
FIG. 10 is a diagram illustrating the method of controlling the virtual machine schedule time shown in FIG. 9.

FIG. 10 illustrates the method of controlling the virtual machine schedule time shown in FIG. 9.

In FIG. 10, for example, a virtual machine schedule time is scheduled to reach a process P2 immediately after a process P1 has been performed. Under such a condition, system performance deterioration may occur as below. For example, if virtual machine switching is made before the switch from the process P1 to the process P2 has been performed, the process P2 is executed only for a short period of time and is terminated, and hence the process switch may result in a meaningless context switch. Moreover, in a case where the process P1 sets spin lock for synchronization between processes, the release of the spin lock may be held for a long time until the virtual machine VM2 is rescheduled, after the virtual machine VM1 is run, and the process P2 is executed by the scheduled virtual machine VM2.

In this case, the virtual machine schedule may be carried out in advance.

For example, the virtual machine schedule time control apparatus (for example, the schedule time control unit 106 in FIG. 1) may check whether a value of "Next_VMM"–"Now" is smaller than the third reference time T3 at the time of generation of the process schedule on the non-real-time process. This check indicates that the consecutive execution time of the non-real-time process cannot be guaranteed, and thus the virtual machine schedule time is advanced and the virtual machine schedule is carried out. Otherwise, a normal process schedule on the non-real-time process is allowed.

As such, the schedule time control apparatus and method may improve real-time properties and performance of the system because the virtual machine schedule time can be appropriately adjusted. In addition, the schedule time control apparatus and method may increase responsiveness of a real-time application program such as Voice over Internet Protocol (VoIP), Instant Messaging, Video-on-Demand, Web Browsing, or the like in a virtualization environment. Furthermore, the schedule time control apparatus and method may prevent inefficient context switching or performance degradation due to long lock wait time.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running. A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A virtualization apparatus, comprising:
hardware configured to execute a plurality of virtual machines, the plurality of virtual machines each comprising:
  a process scheduler configured to schedule processes to be executed by the plurality of virtual machines using a process schedule time at which a process is invoked or switched; and
  a virtual machine monitor configured to provide a virtualized execution environment, atop the hardware, to each of the plurality of virtual machines, the virtual machine monitor comprising:
    a virtual machine scheduler configured to schedule the execution of each of the plurality of virtual machines on the hardware using a virtual machine schedule time at which a virtual machine of the plurality of virtual machines is invoked or switched with another virtual machine of the plurality of virtual machines; and
    a schedule time control unit configured to:
      change the virtual machine schedule time based on the process schedule time of a virtual machine of the plurality of virtual machines, in response to determining that a process being executed has not been executed for at least a first reference amount of time;
      postpone the virtual machine schedule time of a next virtual machine of the plurality of virtual machines by an amount of time to synchronize a process schedule time of the next virtual machine with another virtual machine of the plurality of virtual machines, in response to determining that a process of the another virtual machine will not be executed within a second reference amount of time; and
      define a hypercall which is transferred from a currently executing virtual machine and detect a process switch to a real-time process through the hypercall in response to scheduling occurring in the currently executing virtual machine, and increase an execution time of the currently executing virtual machine by a delay time while the currently executing virtual machine is executing the real-time process, in response to determining that a difference between a present time value and a time value at which the real-time process is scheduled is less than a minimum execution time of the real-time process.

2. The virtualization apparatus of claim 1, wherein the schedule time control unit is further configured to:
detect synchronization information comprising one or more of the virtual machine schedule time, the process schedule time, a type of process that is currently executed, a type of process that is to be executed next, or an interrupt to be transmitted to a virtual machine; and
change the virtual machine schedule time based on the process schedule time.

3. The virtualization apparatus of claim 1, wherein the schedule time control unit is further configured to:
determine, before a virtual machine schedule is commenced, whether another real-time process is being executed by the virtual machine; and
change the virtual machine schedule time to be after termination of the another real-time process, in response to determining that the another real-time process is being executed by the virtual machine.

4. The virtualization apparatus of claim 1, wherein the schedule time control unit is further configured to:
determine, before the virtual machine schedule is commenced, whether an interrupt has been transmitted to the virtual machine;
determine whether processing of the interrupt can be performed at least for a third reference amount of time, in response to determining that the interrupt has been transmitted; and
delay the virtual machine schedule time by a delay period, in response to determining that the processing of the interrupt is not performed at least for the third reference amount of time.

5. The virtualization apparatus of claim 4, wherein the schedule time control unit is further configured to invoke the virtual machine scheduler at the delayed virtual machine schedule time or at a time of termination of the execution of another real-time process woken up by the interrupt.

6. The virtualization apparatus of claim 1, wherein the schedule time control unit is further configured to:
- determine, before a process schedule is commenced, whether a process to be executed next is a non-real-time process;
- determine whether the non-real-time process can be executed at least for a third reference amount of time, in response to determining that the process to be executed next is the non-real-time process; and
- advance the virtual machine schedule time, in response to determining that the non-real-time process is not executed at least for the third reference amount of time.

7. The virtualization apparatus of claim 6, wherein the schedule time control unit is further configured to synchronize the virtual machine schedule with the process schedule time.

8. The virtualization apparatus of claim 1, wherein the schedule time control unit is further configured to:
- switch from the virtual machine to the another virtual machine at a time of scheduling another process, in response to the executing of the real-time process being terminated within the delay time; and
- switch from the virtual machine to the another virtual machine at an end of the delay time, in response to the executing of the real-time process not being terminated within the delay time.

9. A hardware apparatus to control a virtual machine schedule time, the apparatus comprising:
- hardware configured to execute a plurality of virtual machines;
- a process scheduler configured to schedule processes to be executed by the plurality of virtual machines using a process schedule time at which a process is invoked or switched; and
- a virtual machine monitor configured to provide a virtualized execution environment, atop the hardware, to each of the plurality of virtual machines, the virtual machine monitor comprising:
  - a virtual machine scheduler configured to schedule execution of each of the plurality of virtual machines on the hardware using a virtual machine schedule time at which a virtual machine of the plurality of virtual machines is invoked or switched with another virtual machine of the plurality of virtual machines; and
  - a schedule time control unit configured to:
    - change the virtual machine schedule time based on the process schedule time of the virtual machine of the plurality of virtual machines, in response to determining that a process being executed has not been executed for at least a first reference amount of time;
    - postpone the virtual machine schedule time of a next virtual machine of the plurality of virtual machines by an amount of time to synchronize a process schedule time of the next virtual machine with another virtual machine of the plurality of virtual machines based on detected synchronization information, in response to determining that a process of the another virtual machine will not be executed within a second reference amount of time; and
    - define a hypercall which is transferred from a currently executing virtual machine and detect a process switch to a real-time process through the hypercall in response to scheduling occurring in the currently executing virtual machine, and increase an execution time of the currently executing virtual machine by a delay time while the currently executing virtual machine is executing the real-time process, in response to determining that a difference between a present time value and a time value at which the real-time process is scheduled is less than a minimum execution time of the real-time process.

10. The apparatus of claim 9, wherein the control unit is further configured to:
- determine, before the virtual machine schedule is commenced, whether another real-time process is being executed by the virtual machine; and
- change the virtual machine schedule time to be after termination of the another real-time process, in response to determining that the another real-time process is being executed by the virtual machine.

11. The apparatus of claim 9, wherein the control unit is further configured to:
- determine, before a virtual machine schedule is commenced, whether an interrupt has been transmitted to the virtual machine;
- determine whether processing of the interrupt can be performed at least for a third reference amount of time, in response to determining that the interrupt has been transmitted; and
- delay the virtual machine schedule time by a delay period, in response to determining that a process of the interrupt is not performed at least for the third reference amount of time.

12. The apparatus of claim 11, wherein the control unit is further configured to invoke the virtual machine scheduler to schedule the virtual machine at the delayed virtual machine schedule time or at a time of terminating the execution of another real-time process woken up by the interrupt.

13. The apparatus of claim 9, wherein the control unit is further configured to:
- determine, before a process schedule is commenced, whether a process to be executed next is a non-real-time process;
- determine whether the non-real-time process can be executed at least for a third reference amount of time, in response to determining that a process to be executed next is the non-real-time process; and
- advance the virtual machine schedule time, in response to determining that the non-real-time process is not executed at least for the third reference amount of time.

14. The apparatus of claim 13, wherein the control unit is further configured to synchronize the virtual machine schedule time with the process schedule time.

15. A method of controlling a virtual machine schedule time using hardware configured to execute a plurality of virtual machines, the method comprising:
- scheduling, by a process scheduler, processes to be executed by the plurality of virtual machines using a process schedule time at which a process is invoked or switched; and
- providing, by a virtual machine monitor, a virtualized execution environment, atop the hardware, to each of the plurality of virtual machines, wherein the providing of the virtualized execution environment comprises:
  - scheduling, by a virtual machine scheduler, execution of each of the plurality of virtual machines on the hardware using a virtual machine schedule time at which a virtual machine of the plurality of virtual machines is invoked or switched with another virtual machine of the plurality of virtual machines; and scheduling, by a schedule time control unit, by:

changing the virtual machine schedule time based on the process schedule time of a virtual machine of the plurality of virtual machines, in response to determining that a process being executed has not been executed for at least a first reference amount of time;

postponing the virtual machine schedule time of a next virtual machine of the plurality of virtual machines by an amount of time to synchronize a process schedule time of the next virtual machine with another virtual machine of the plurality of virtual machines based on detected synchronization information, in response to determining that a process of the another virtual machine will not be executed within a second reference amount of time; and defining a hypercall which is transferred from a currently executing virtual machine and detecting a process switch to a real-time process through the hypercall in response to scheduling occurring in the currently executing virtual machine, and increasing an execution time of the virtual machine by a delay time while the currently executing virtual machine is executing the real-time process, in response to determining that a difference between a present time value and a time value at which the real-time process is scheduled is less than a minimum execution time of the real-time process.

16. The method of claim 15, wherein the changing of the virtual machine schedule time comprises:

determining, before a virtual machine schedule is commenced, whether another real-time process is being executed by a virtual machine; and changing the virtual machine schedule time to be after termination of the another real-time process, in response to determining that the another real-time process is being executed by the virtual machine.

17. The method of claim 15, wherein the changing of the virtual machine schedule time comprises:

determining, before a virtual machine schedule is commenced, whether an interrupt has been transmitted to the virtual machine;

determining whether processing of the interrupt can be performed at least for a third reference amount of time, in response to determining that the interrupt has been transmitted; and delaying the virtual machine schedule time by a delay period, in response to determining that a process of the interrupt is not performed at least for the third reference amount of time.

18. The method of claim 15, wherein the changing of the virtual machine schedule time comprises:

determining, before a process schedule is commenced, whether a process to be executed next is a non-real-time process;

determining whether the non-real-time process can be executed at least for a third reference amount of time, in response to determining that a process to be executed next is the non-real-time process; and advancing the virtual machine schedule time, in response to determining that the non-real-time process is not executed at least for the third reference amount of time.

19. A method of controlling a virtual machine schedule time using hardware configured to execute a plurality of virtual machines, the method comprising:

before a beginning of a virtual machine schedule, determining whether to delay a virtual machine schedule time by an amount of time based on execution of a real-time process within a first time period or transmission of an interrupt to a currently executing virtual machine within a second time period;

in response to the virtual machine schedule time being delayed, determining whether the execution of the real-time process has terminated, or the time has been reached;

scheduling, by a process scheduler, processes to be executed by the plurality of virtual machines using a process schedule time at which a process is invoked or switched; and providing, by a virtual machine monitor, a virtualized execution environment, atop the hardware, to each of the plurality of virtual machines, wherein the providing of the virtualized execution environment comprises:

scheduling, by a virtual machine scheduler, execution of each of the plurality of virtual machines on the hardware using a virtual machine schedule time at which a virtual machine of the plurality of virtual machines is invoked or switched with another virtual machine of the plurality of virtual machines; and scheduling, by a schedule time control unit, by:

changing the virtual machine schedule time based on the process schedule time of a virtual machine of the plurality of virtual machines, in response to determining that a process being executed has not been executed for at least a first reference amount of time;

postponing the virtual machine schedule time of a next virtual machine of the plurality of virtual machines by an amount of time to synchronize a process schedule time of the next virtual machine with another virtual machine of the plurality of virtual machines, in response to determining that a process of the another virtual machine will not be executed within a second reference amount of time; and defining a hypercall which is transferred from a currently executing virtual machine and detecting a process switch to a real-time process through the hypercall in response to scheduling occurring in the currently executing virtual machine, and increasing an execution time of the virtual machine by a delay time while the currently executing virtual machine is executing the real-time process, in response to determining that a difference between a present time value and a time value at which the real-time process is scheduled is less than a minimum execution time of the real-time process.

20. The method of claim 19, wherein the amount of time comprises a maximum amount of time by which the virtual machine schedule time may be delayed.

21. The method of claim 19, wherein the first time period corresponds to an amount of time for executing the real-time process.

22. The method of claim 19, wherein the second time period corresponds to an amount of time for executing the interrupt.

* * * * *